(12) United States Patent
Engel

(10) Patent No.: US 11,161,380 B2
(45) Date of Patent: Nov. 2, 2021

(54) DEVICE TO ALIGN A TRAILER COUPLER TO A HITCH BALL

(71) Applicant: James Engel, Mountain View, AR (US)

(72) Inventor: James Engel, Mountain View, AR (US)

( * ) Notice: Subject to any disclaimer, the term of this patent is extended or adjusted under 35 U.S.C. 154(b) by 185 days.

(21) Appl. No.: 16/529,315

(22) Filed: Aug. 1, 2019

(65) Prior Publication Data

US 2021/0031575 A1    Feb. 4, 2021

(51) Int. Cl.
*B60D 1/36*    (2006.01)

(52) U.S. Cl.
CPC ..................... *B60D 1/363* (2013.01)

(58) Field of Classification Search
CPC ....................................................... B60D 1/363
USPC ......................................................... 280/477
See application file for complete search history.

(56) References Cited

U.S. PATENT DOCUMENTS

| | | | | |
|---|---|---|---|---|
| 4,226,438 A * | 10/1980 | Collins | ................... | B60D 1/363 280/477 |
| 4,417,748 A * | 11/1983 | Dortch | ................... | B60D 1/363 280/477 |
| 4,871,184 A * | 10/1989 | Johnson | ................ | B60D 1/363 280/477 |
| 8,313,119 B2 * | 11/2012 | Frantz | ..................... | B60D 1/06 280/507 |
| 9,511,637 B1 * | 12/2016 | Frey | ....................... | B60D 1/363 |
| 2004/0207176 A1 * | 10/2004 | Webster | ................ | B60D 1/363 280/477 |
| 2006/0097480 A1 * | 5/2006 | Hegefeld | ............... | B60D 1/363 280/477 |
| 2007/0114760 A1 * | 5/2007 | Hegefeld | ............... | B60D 1/363 280/477 |
| 2012/0119467 A1 * | 5/2012 | Svihla | ...................... | B60D 1/46 280/477 |
| 2013/0313805 A1 * | 11/2013 | Holland | ................. | B60D 1/363 280/477 |
| 2014/0265246 A1 * | 9/2014 | Mackey | ................... | B60D 1/06 280/477 |

* cited by examiner

*Primary Examiner* — Tony H Winner
(74) *Attorney, Agent, or Firm* — Thomas P. Heed; Heed Law Group

(57) ABSTRACT

A device to align a trailer coupler to a hitch ball intended for use with a standard ball mount hitch. The device has a base and a plurality of vertical surfaces which are orthogonal to the base. The device mates with a standard hitch ball. The base has a through hole that can accommodate the shank of a standard hitch ball. The shank of the hitch ball is inserted through the base and through a ball mount platform. A threaded fastener secures the hitch ball. When a trailer coupler contacts the device, the device center the trailer coupler over the hitch ball.

1 Claim, 11 Drawing Sheets

DEVICE TO ALIGN A TRAILER COUPLER TO A HITCH BALL

FIELD OF INVENTION

This invention relates to the class for vehicle connections and one or more sub-classes related to facilitating connections to hitch catchers.

BACKGROUND OF INVENTION

Many vehicles, such as pick-up trucks and SUVs, are designed to tow trailers. Trailers are used to transport a variety of items that would not fit within a vehicle, such as boats, jet skis, snow mobiles, and work equipment. Travel trailers used for camping are also common.

A trailer hitch is the primary connector between a tow vehicle, such as a pick-up or SUV, and a trailer. A trailer hitch is designed and intended to be a structural component, bolting onto a tow vehicle. The trailer hitch is the coupling point to hook-up the trailer. The most common type of hitch for light vehicles, pick-ups and SUVs is a receiver hitch. A receiver hitch is connected to the rear underside of the tow vehicle, usually with a threaded fastener such as a bolt or screw. The receiver hitch has a tube, called a receiver tube, for attaching a ball mount or other hitch accessory. The receiver tube is usually located under the center of the rear bumper of a tow vehicle. Receiver hitches generally have a vehicle-specific design and a standard receiver tube size.

The most common type of mount is a ball mount. A ball mount is comprised of a shank, a hitch ball platform, and a hitch ball. The shank of the ball mount mates with the receiver tube of a receiver hitch. The hitch ball platform provides a solid mounting point for a hitch ball. A hitch ball or trailer ball is the immediate connection point between a tow vehicle and a trailer. It is made up of a metal ball, a shank or stem, and a threaded fastener extending out of the bottom of the shank. Connected to the trailer coupler, a hitch ball allows a tow-vehicle-and-trailer combination to turn corners and travel smoothly over bumps and hills.

The ball mount is usually fixed in place with a hitch pin. A hitch pin is a metal-rod designed to keep a ball mount shank from sliding out of a hitch receiver tube. A hitch pin may be bent in an "L" shape. It is designed to insert into the side of the hitch receiver, pass through the ball mount shank and come out the other side.

A trailer coupler, in conjunction with a hitch ball, connects a trailer to the tow vehicle. The trailer coupler is the front part of the trailer, and it is designed to latch onto a hitch ball and articulate around it for smooth towing.

Actually connecting a vehicle to a trailer takes skill, and sometimes luck. Typically, a vehicle backs up towards a stationary trailer and tries to position the vehicle so that the hitch ball is directly under the coupler. This can take may attempts, and often requires a spotter. The spatial relationship between a trailer coupler and a standard hitch ball is usually invisible to the driver. Even under the best circumstances, skilled drivers end up with the tow vehicle and trailer coupler mis-aligned. Successfully coupling the tow vehicle to the trailer can take several frustrating attempts. In extreme cases, the driver inadvertently bumps the trailer coupler with the tow vehicle, which can leave the bumper or rear body panel of the tow vehicle scratched or dented.

There are many devices in the market that try to help drivers spatially orient the vehicle so that the trailer coupler and hitch ball are aligned: backing cameras, RFID solutions, cellphone apps, and magnets, to name a few. Such aids are usually expensive and of marginal practical use. The spatial logistics of backing a vehicle so that it is aligned with a trailer coupler is conceptually difficult for most drivers. The tools available in the marketplace are not intuitive and easy to use. They are not easy to install. They are expensive. What the market really needs is an easy-to-install device that aligns a trailer coupler to a hitch ball reliably, intuitively, and without vehicle or trailer damage.

SUMMARY OF THE INVENTION

This summary is intended to disclose the present invention, a device to align a trailer coupler to a hitch ball. The embodiments and descriptions are used to illustrate the invention and its utility, and are not intended to limit the invention or its use. The device is intended to allow a driver to gently back a vehicle with an attached ball-mount hitch into a trailer coupler.

First, a vehicle is outfitted with the present invention attached to a standard ball-mount hitch. The vehicle is then backed towards the trailer. If the present invention makes contact with the trailer coupler, it forces the trailer coupler to be centered overt the hitch ball. The present invention also prevents damage to the tow vehicle bumper and body panels. The device is designed to make repeated contact with a trailer coupler.

In the primary embodiment, the device is formed from steel. Typically, this involves punching a blank out of rolled steel. The punched blank is then stamped into a three-dimensional shape. This means that the present invention is integrally formed from a single piece of material, which improves its structural integrity and durability. Depending on the gauge of raw steel, the device to align a trailer coupler to a hitch ball may need to be progressively stamped in order to be properly shaped.

The punched blank is a large "T". The T-shaped punched blank has a wide region and a narrow region. The wide region is approximately three times the size of the narrow region, but this ratio can be varied significantly while maintaining functionality. Both the internal and external corners of the T-shaped punched blank are filleted, in order to prevent scratches, cuts, and burs. The narrow region has a centered through hole, which will receive the shank of the hitch ball. The narrow region has two lateral edges and a front edge.

The T-shaped punched blank is stamped or progressively stamped into the present invention, a device to align a trailer coupler to a hitch ball. The narrow region of the T-shaped punched blank becomes the base of the device to align a trailer coupler to a hitch ball. The material near the lateral edges of the narrow region are bent into lateral surfaces in the base, to provide greater rigidity. The base is orthogonal, or nearly orthogonal, to three vertical surfaces, a left vertical surface, a central vertical surface, and a right vertical surface. Nearly orthogonal means that the angle between the two surfaces may be slightly more or slightly less than 90°. The base is orthogonally, or nearly orthogonally, and contiguously connected with the central vertical surface with a surface fillet. The left vertical surface is formed at an acute angle to the central vertical surface. The left vertical surface is attached contiguously to the central vertical surface with a surface fillet. The left vertical surface is orthogonal, or nearly orthogonal, to the base, although it is not contiguous with, or connected to, the base. The right vertical surface is formed at an acute angle to the central vertical surface. The right vertical surface is attached contiguously to the central vertical surface with a surface fillet. The right vertical surface is orthogonal, or nearly orthogonal, to the base, although it is not contiguous with, or connected to, the base.

The device to align a trailer coupler to a hitch ball mates with a standard hitch ball mount. The fastener of the hitch ball shank passes through the through hole in the base and the hitch ball platform. The hitch ball is secured with a washer and threaded nut on the underside of the hitch ball platform. The left, central, and right vertical surfaces partially surround the hitch ball. The central vertical surface is interposed between the hitch ball and the ball mount shank. The central vertical surface is substantially orthogonal to the ball mount shank.

The ball mount shank is placed in the receiver. A hitch pin holds the ball mount shank in the receiver. In use, a user backs up a vehicle with the present invention until the trailer coupler contacts the present invention. If the trailer coupler is offset to the left, the left vertical surface directs the coupler over the hitch ball. If the trailer coupler is offset to the right, the right vertical surface directs the coupler over the hitch ball. In this way, the present invention allows a user to position the trailer coupler over the hitch ball. Almost as important for most users, the present invention prevents the user from scratching or damaging their vehicle bumper during the hitching operation.

The current invention is fabricated from a structural metal, preferably steel. The current invention can also be fabricated from a strong structural metal, such as aluminum or magnesium, although these materials would be price prohibitive without really adding much to the performance of the device. The material needs to be corrosion resistant, temperature stable, and environmentally non-reactive. Most steel alloys are appropriate, provided they are treated with a corrosion coating such as trivalent chromium or galvanized zinc, or their equivalents. There are numerous suitable corrosion coatings for steel that could be used for the present invention.

The shape is punched from raw steel and then stamped into its final shape.

For both cosmetic and performance reasons, after stamping, the present invention could be over-molded with a resin. Resins such as polypropylene would allow great cosmetic flexibility to be achieved with the present invention. Additionally, polypropylene, as well as other resins, would have a very low co-efficient of friction with the trailer coupler during the coupling operation. This would allow the coupler to more easily move over the vertical surfaces while it is being self-aligned.

The present invention can be over-molded with other polymers, as well, such acrylonitrile butadiene styrene ("ABS"), polycarbonate, nylon 6, acrylic, polyoxymethylene ("POM"), and glass-reinforced polypropylene

BRIEF DESCRIPTION OF THE DRAWINGS

The present invention is illustrated with 11 drawings on 11 sheets.

DETAILED DESCRIPTION OF THE DRAWINGS

The following descriptions are not meant to limit the invention, but rather to add to the summary of invention, and illustrate the present invention, a device to align a trailer coupler to a hitch ball. The present invention is illustrated with a variety of drawings showing various possible embodiments.

Figure 1:
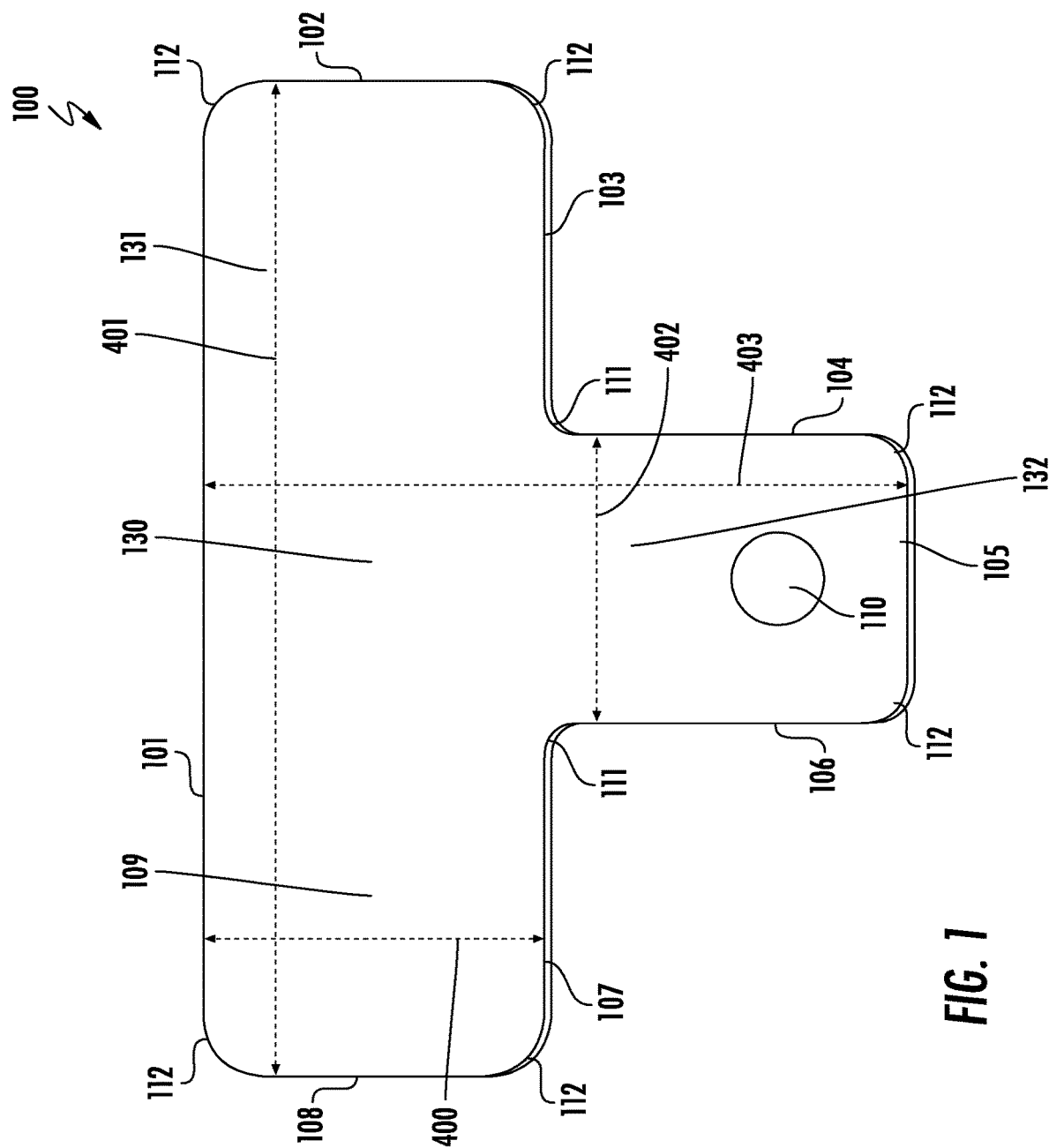
FIG. 1 is a top view of a stamped metal blank used to form the invention.

FIG. 1 shows a top view of a punched metal blank 100 from which the device to a align tow-hitch with a vehicle 1 is formed. The punched metal blank 100 looks somewhat like the letter "T". The punched metal blank 100 has a continuous, planar top surface 109, 130, 131, 132. The top surface 109, 130, 131, 132 has a wide region defined by 109, 130, 131, with a wide region length 401 and a wide region width 400. The top surface 109, 130, 131, 132 has a narrow region 132 defined by a narrow region length 402. The top surface 109, 130, 131, 132 has an overall width 403. To prevent snags and scratches, the external corners 112 of the top surface 109, 130, 131, 132 are filleted 112. Similarly, the internal corners 111 of the top surface 109, 130, 131, 132 are also filleted 111.

The top surface 109, 130, 131, 132 has a plurality of edges 101, 102, 103, 104, 105, 106, 107, 108. The narrow region 132 has three edges 104, 105, 106 that define it. The narrow region 132 has a front edge 105 and two lateral edges 104, 106. The front edge 105 of the narrow region 132 is connected to each of the lateral edges 104, 106, with a filleted external corner 112.

The wide region 109, 130, 131 has five edges 101, 102, 103, 107, 108 that define it. The wide region 109, 130, 131 has a top edge 101, two lateral edges 108, 102, and two bottom edges 107, 103. The top edge 101 of the wide region 109, 130, 131 is connected to the two lateral edges 108, 102 with a filleted external corner 112. The left lateral edge 108 is connected to the left bottom edge 107 with a filleted external corner 112. The right lateral edge 102 is connected with the right bottom edge 103 with a filleted external corner 112.

The left bottom edge 107 of the wide region 109, 130, 131 is connected to the left lateral edge 106 of the narrow region 132 with a filleted internal corner 111. The right bottom edge 103 of the wide region 109, 130, 131 is connected with the right lateral edge 104 of the narrow region 132 with a filleted internal corner 111. A through-hole 110 is punched into the narrow region 132.

Figure 2:
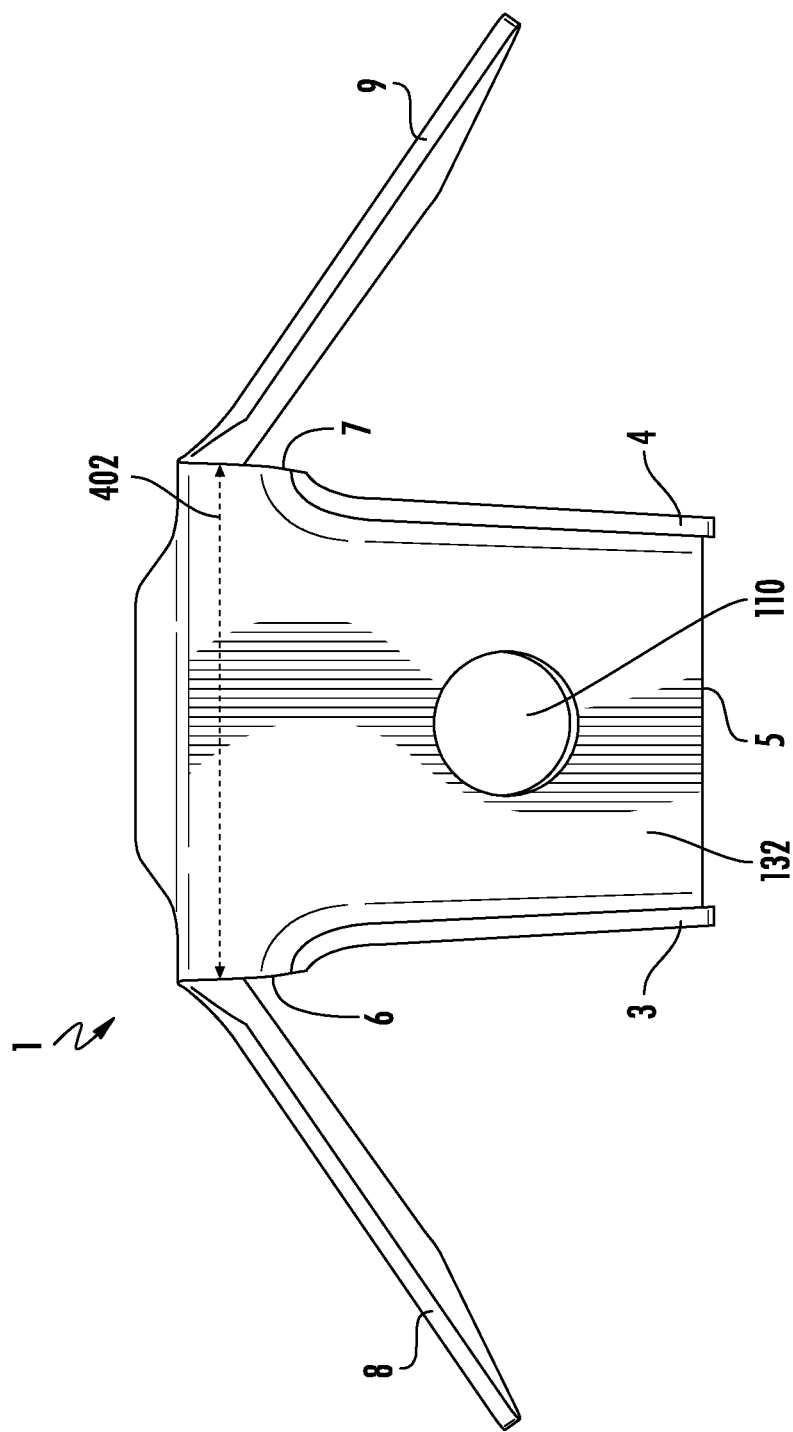
FIG. 2 is a bottom view of the present invention.

The punched metal blank 100 is stamped or progressively stamped into the present invention 1. FIGS. 2-7 show various views of the present invention 1, a device to align a trailer coupler to a hitch ball 1. FIG. 2 shows a bottom view of the present invention 1. FIG. 6 is a front perspective view of the present invention 1. Once stamped, the narrow region 132 becomes the planar bottom surface 132 of the base 2 of the invention 1. The through hole 110 in the planar bottom surface 132 extends through the material to the planar top surface 2 of the base 2.

Looking at FIG. 2, the bottom surface 132 has a front edge 5. The stamping process creates several narrow surfaces 8, 9, 3, 4. The narrow surfaces 8, 9, 3, 4 are as wide as the metal material is thick. The left narrow surface 3 transitions to the left edge 6 of the planar bottom surface 132. The right narrow surface 4 transitions to the right edge 7 of the bottom surface 132. After stamping, the maximum length of the planar bottom surface 132 is the narrow region length 402.

Figure 5:
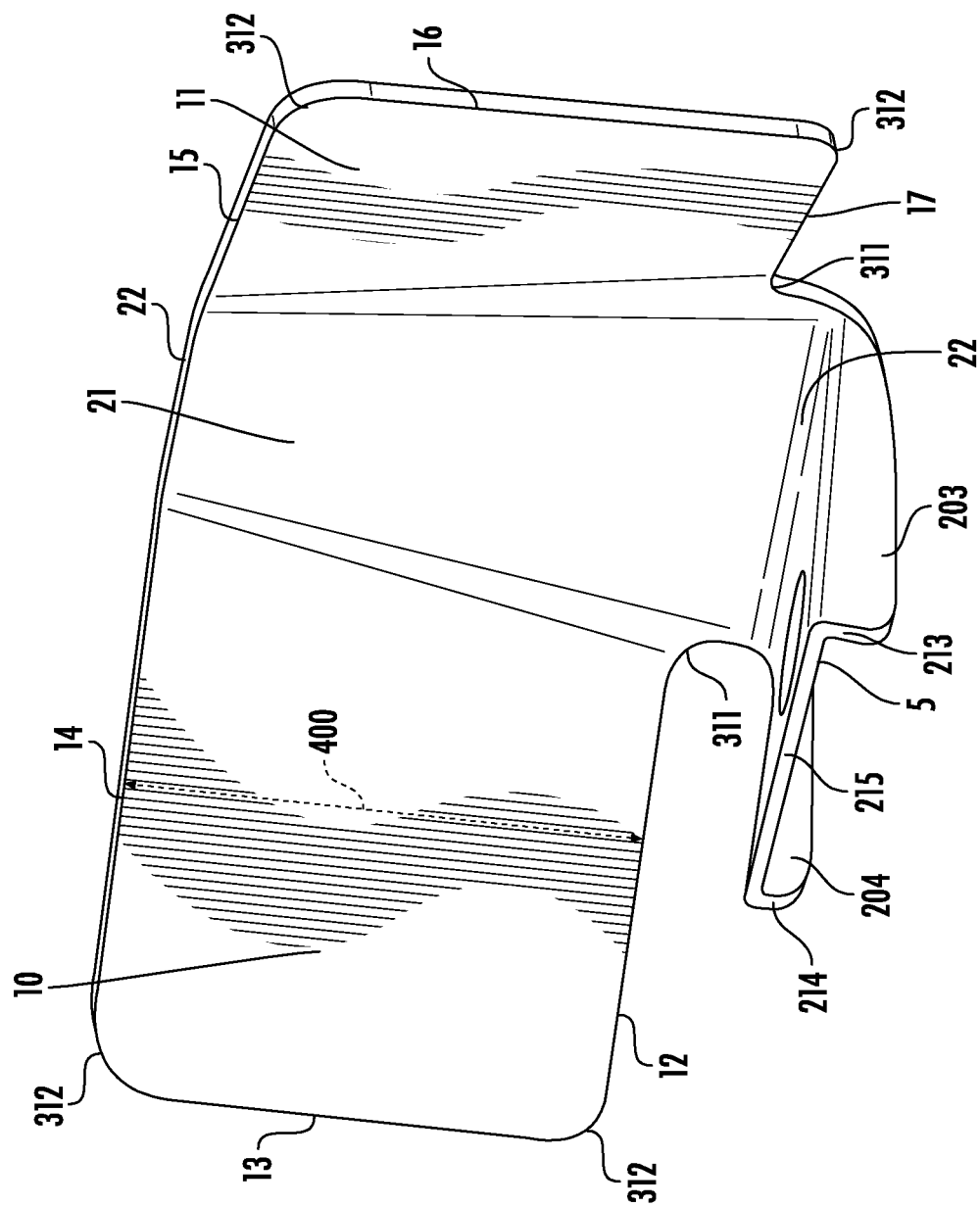
FIG. 5 is a lateral perspective view of the present invention.
Figure 6:
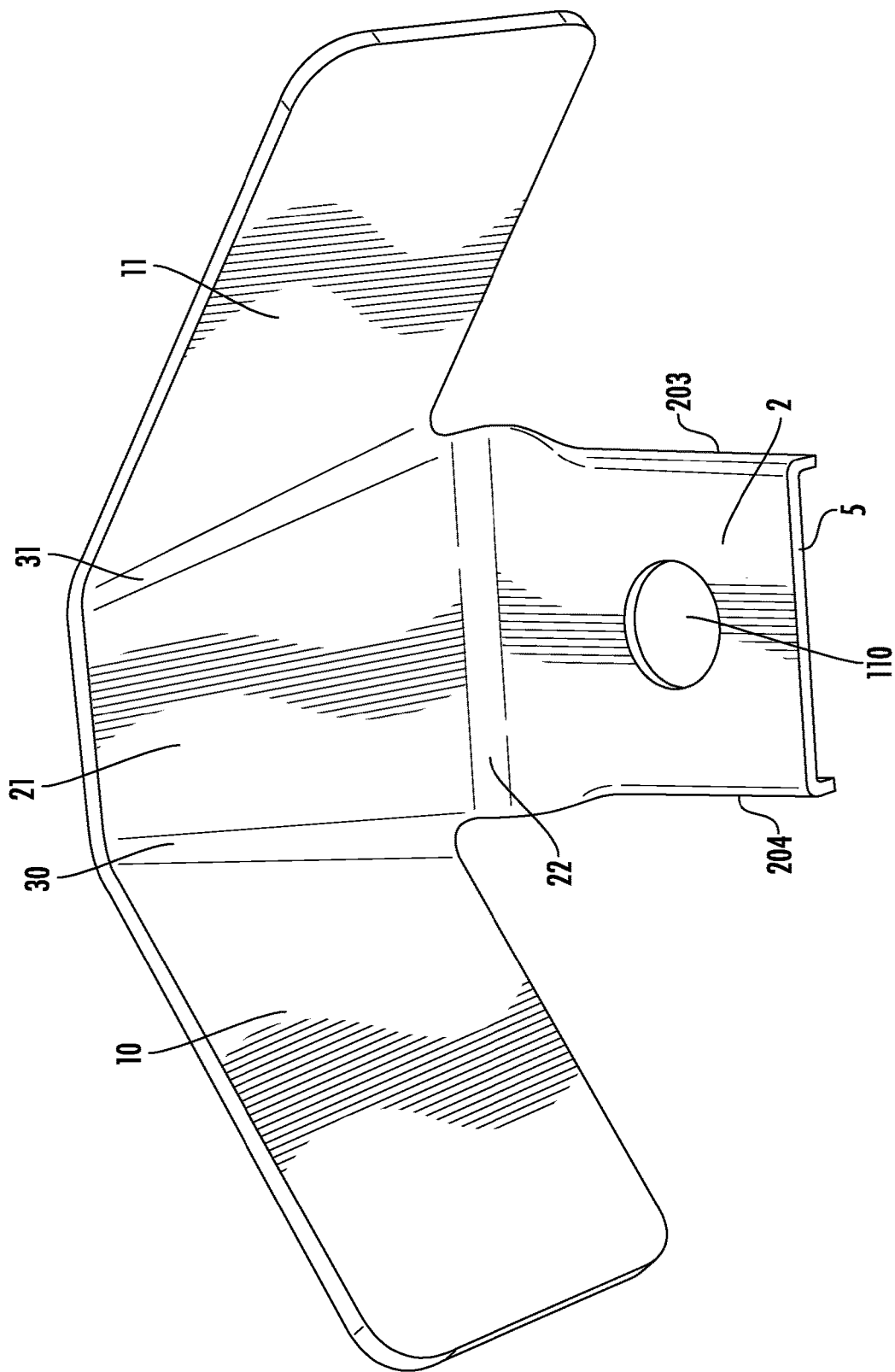
FIG. 6 is a front perspective view of the present invention.

Looking at FIGS. 2 and 5, the stamping process forms two lateral surfaces 203, 204 of the base 2, orthogonal to the planar bottom surface 132. Several contiguous narrow 4, 214, 215, 213, 3 surfaces are formed in the process. The two lateral surfaces 203, 204 stiffen the device to align a trailer coupler to a hitch ball 1. The bottom surface 132 and the front narrow surface 215 share an edge 5. The base 2 is orthogonal, or nearly orthogonal, to the central vertical surface 21 of the invention. The planar top surface 2 of the base 2 is continuous with the central vertical surface 21 at a surface fillet 22. The linear length 402 of the surface fillet 22 is 402.

Figure 7:
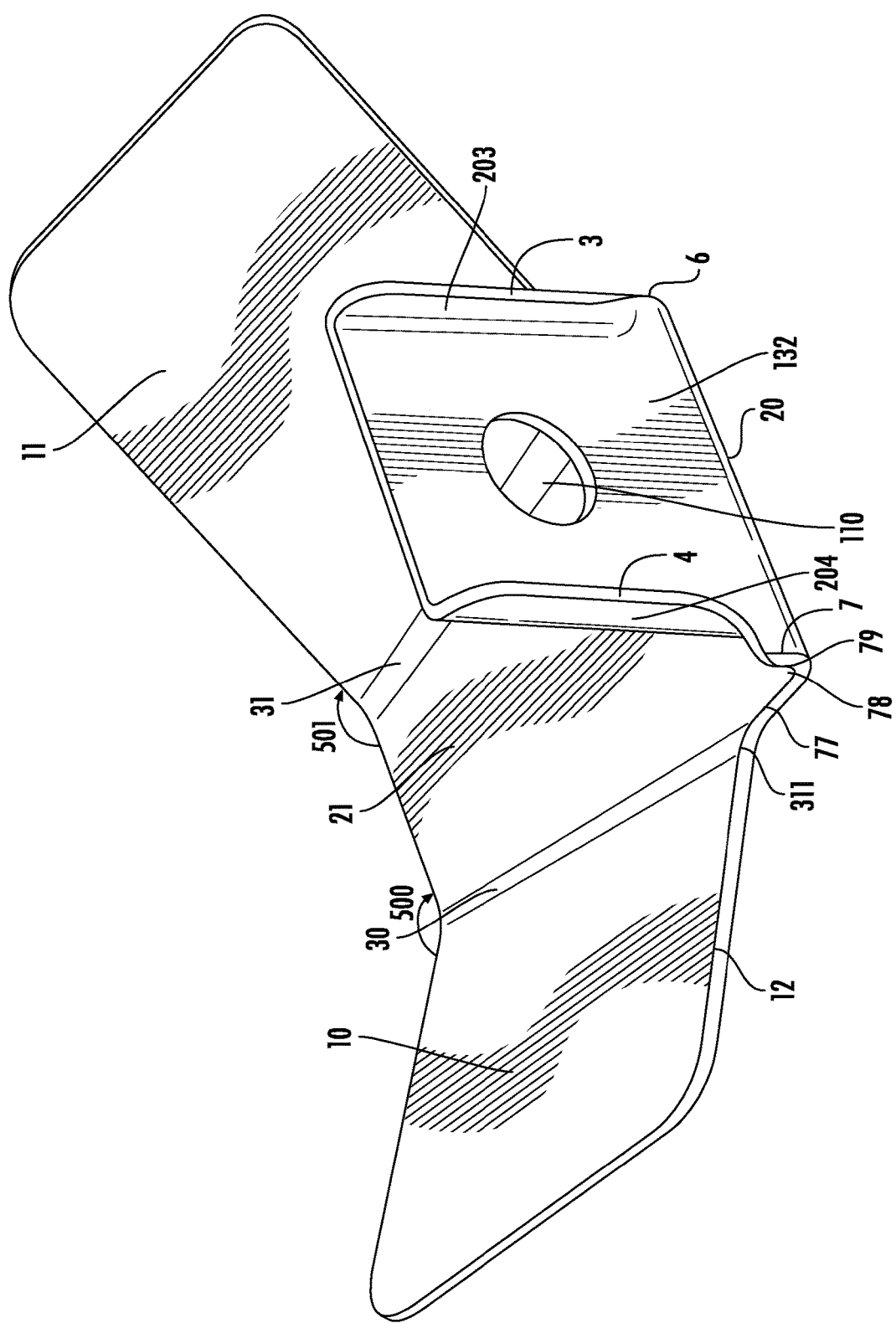
FIG. 7 is a bottom-lateral perspective view of the present invention.
Figure 8:
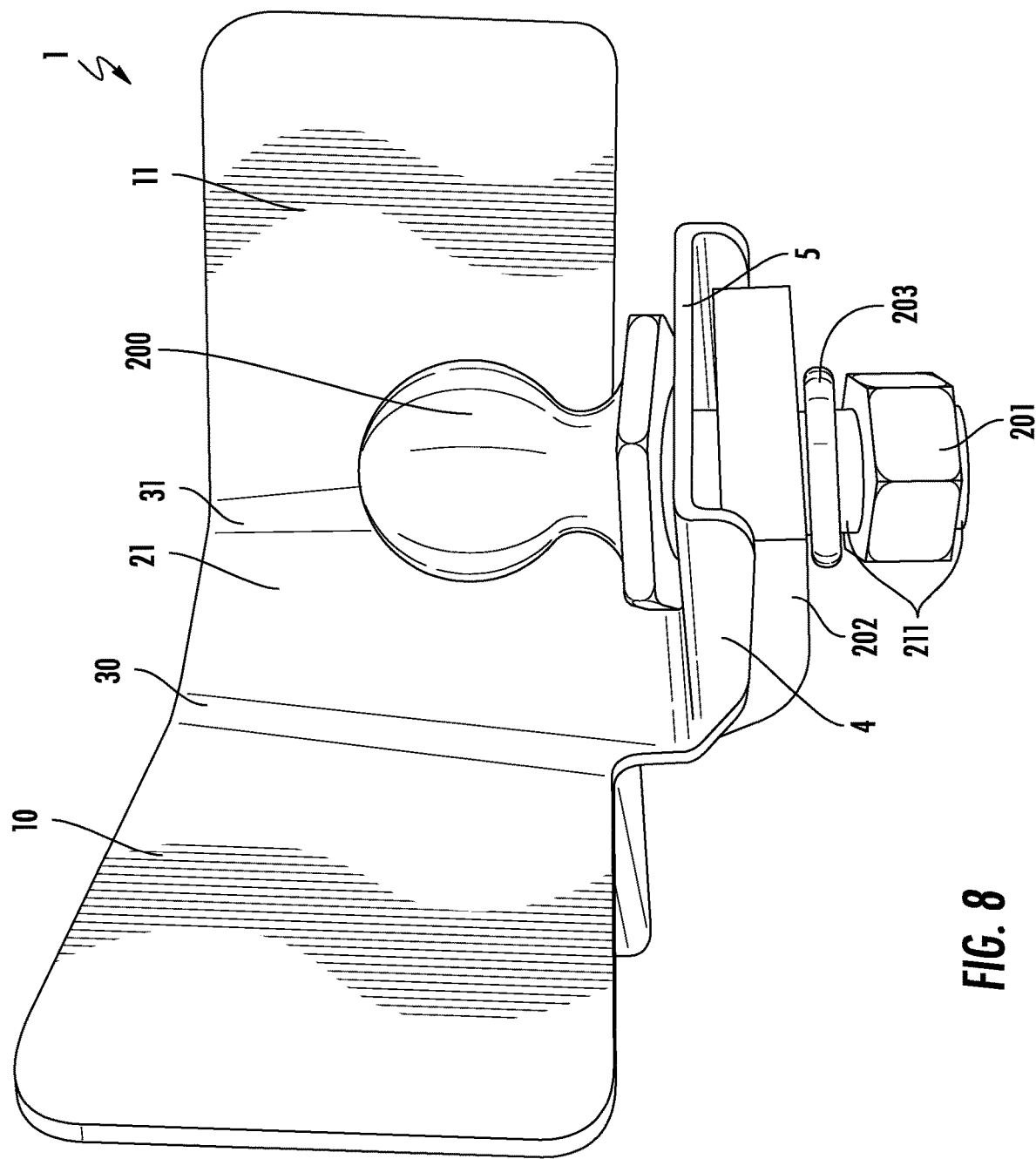
FIG. 8 shows a lateral perspective view of present invention attached to a hitch ball.
Figure 9:
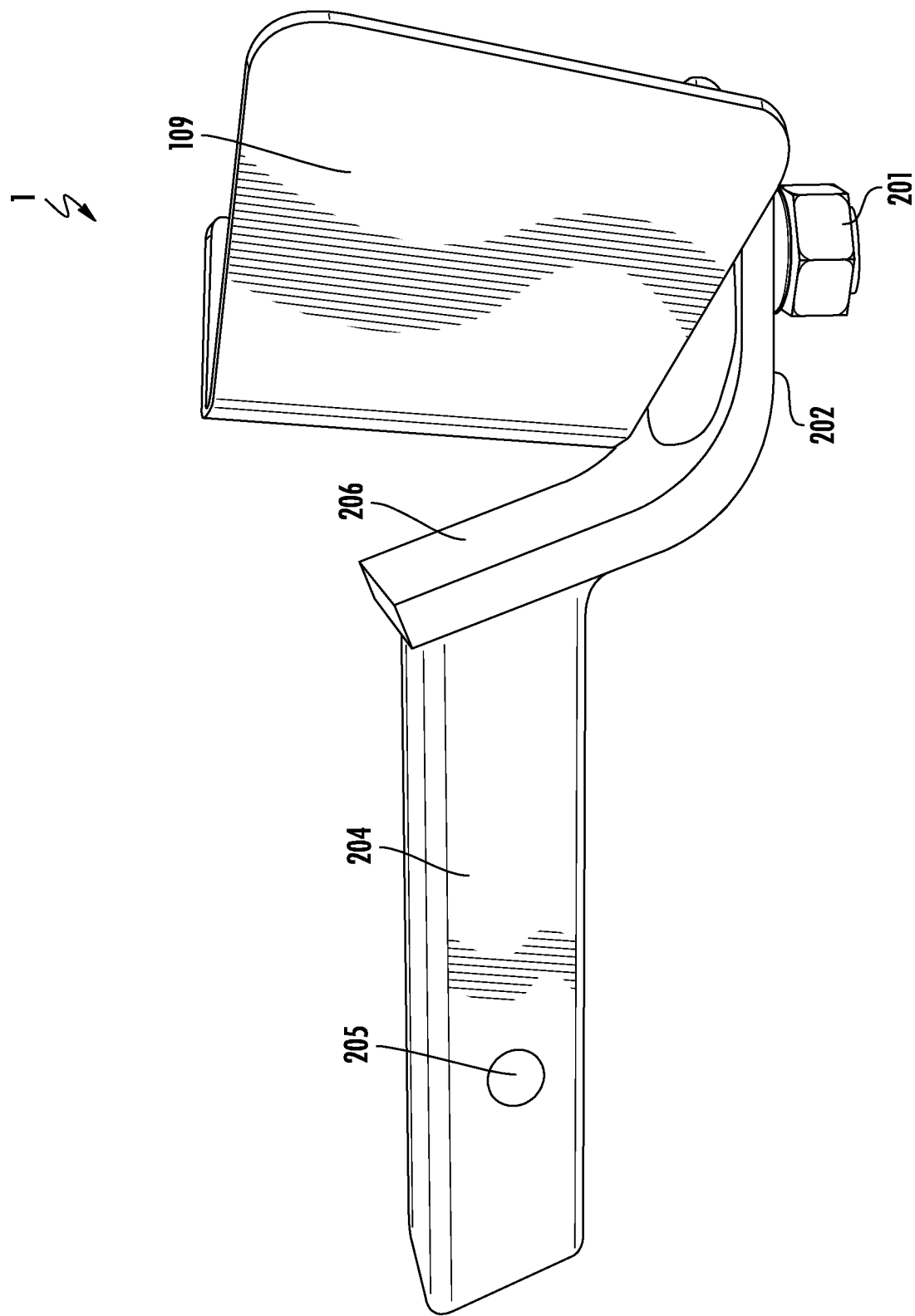
FIG. 9 is a side view of the present invention attached to a hitch ball.
Figure 10:
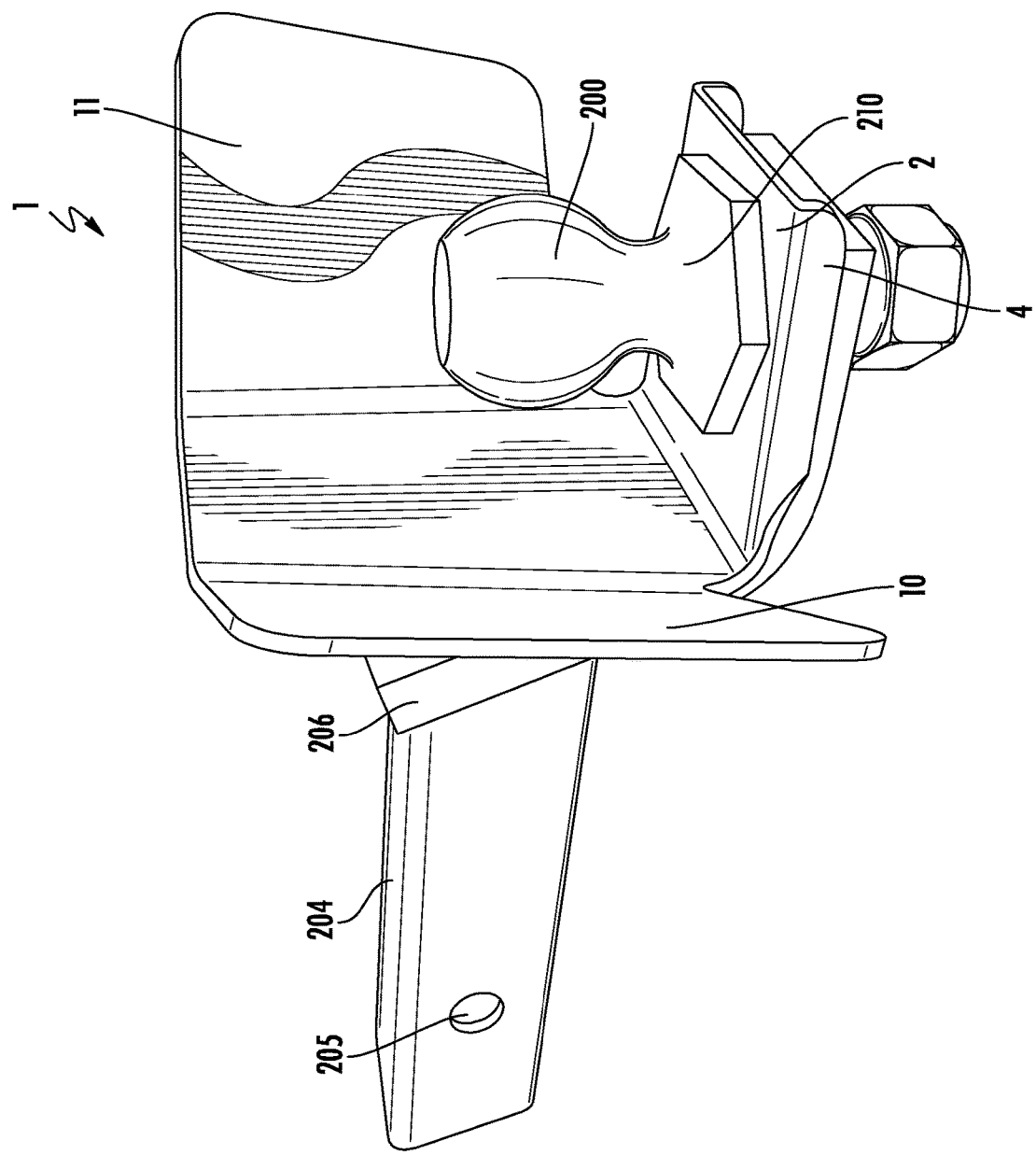
FIG. 10 is a perspective view of the present invention attached to a hitch ball.

Looking at FIGS. 5 and 7, the central vertical surface 21 is contiguous with a left vertical surface 10 and a right vertical surface 11. The central vertical surface 21 is contiguous with the left vertical surface 10 at a vertical surface fillet 30; the central vertical surface 21 is contiguous with the right vertical surface 11 at a vertical surface fillet 31. The central vertical surface 21 makes an acute angle 500 with the left vertical surface 10 about the vertical surface fillet 30. The central vertical surface 21 makes an acute angle 501 with the right vertical surface 11 about the vertical surface fillet 31.

Figure 3:
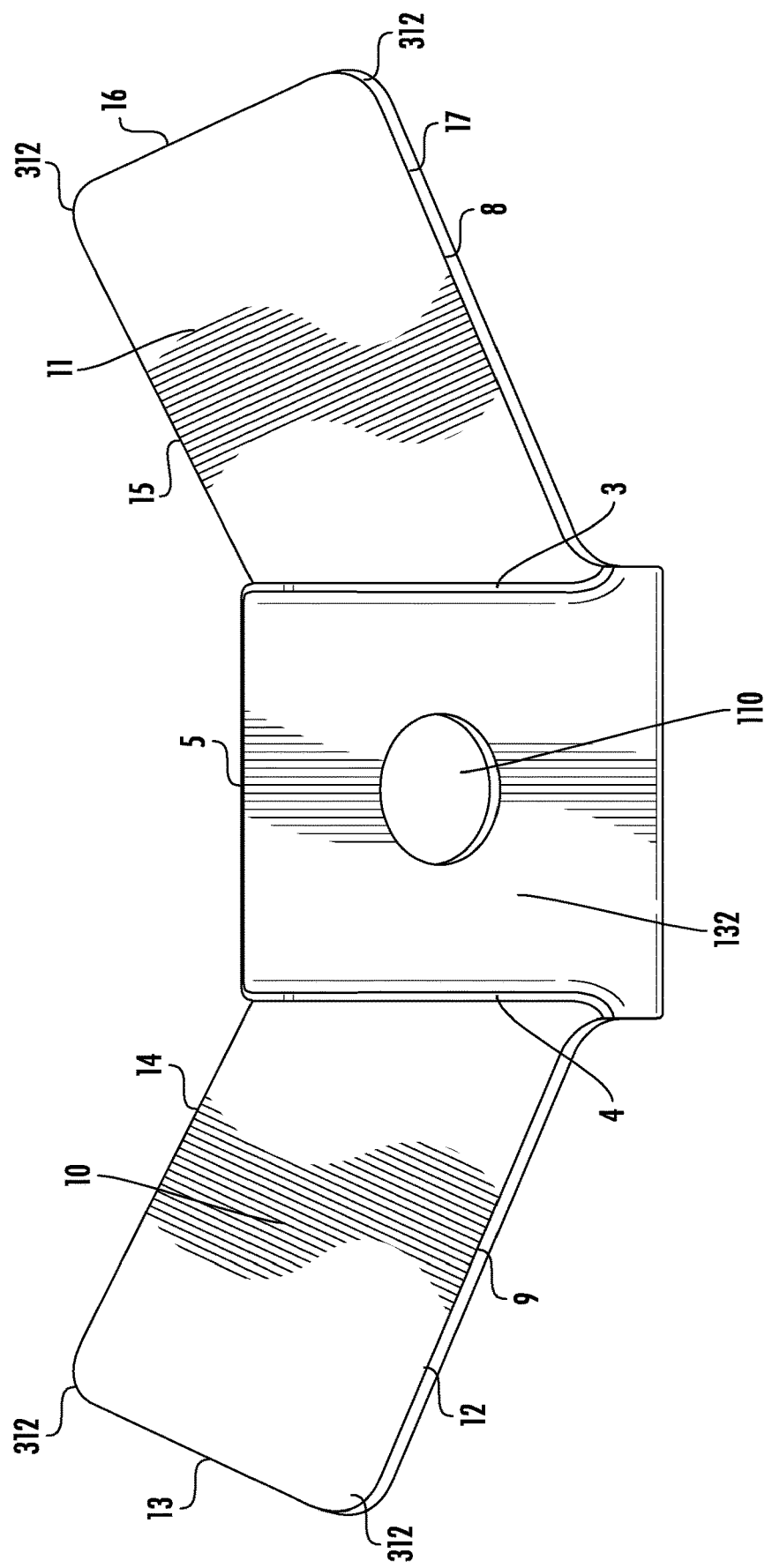
FIG. 3 is a bottom perspective view of the present invention.

Looking at FIGS. 3, 5, and 7, the vertical surfaces 10, 21, 11 have a plurality of edges 12, 13, 14, 222, 15, 16, 17. The top edge 14 of the left vertical surface 10 transitions to the top edge 222 of the central vertical surface 21 at the vertical surface fillet 30. The linear length 422 of the top edge 222 is the width 422 of the central vertical surface 21. The top edge 222 represents the top end 222 of the central vertical surface 21. The central vertical surface 21 tapers from the top edge 222 to the surface fillet 22. The surface fillet 22 represents the bottom end 22 of the central vertical surface 21.

The top edge 15 of the right vertical surface 11 transitions to the top edge 222 of the central vertical surface 21 at the vertical surface fillet 31. The top edge 14 of the left vertical surface 10 is connected with the lateral edge 13 of the left vertical surface 10 at a filleted corner 312. The lateral edge 13 of the left vertical surface 10 is connected with the bottom edge 12 of the left vertical surface 10 at a filleted corner 312. The top edge 15 of the right vertical surface 11 is connected with the lateral edge 16 of the right vertical surface 11 at a filleted corner 312. The lateral edge 16 of the right vertical surface 11 is connected with the bottom edge 17 of the right vertical surface 11 at a filleted corner 312.

Looking at FIG. 3, several narrow surfaces 9, 4, 3, 8, previously discussed, are visible. The bottom surface 132, front edge 5, and through hole 110 are also visible in this view.

Looking at FIG. 7, the bottom edge 12 of the left vertical surface 10 is connected with a short vertical edge 77 at an internal filleted corner 311. The short vertical edge 77 is connected with a short horizontal edge 79 at a curve 78 caused by the top surface fillet 22. The height 400 of the vertical surfaces 10, 21, 11 is the wide region width 400, after stamping.

FIGS. 6 and 7 show the top surface fillet 22 and bottom surface fillet 20, orthogonally, or nearly orthogonally, connecting the base 2, 132 to the central vertical surface 21. Both FIGS. 6 and 7 show the left vertical surface 10 connected to the central vertical surface 21 at a vertical surface fillet 30; and the right vertical surface 11 connected to the central vertical surface 21 at a vertical surface fillet 31. The left vertical surface 10, the central vertical surface 21, and the right vertical surface 11 are all orthogonal, or nearly orthogonal, to the planar top surface 2 of the base 2. FIG. 6 shows the top surface fillet 22; FIG. 7 shows the bottom surface fillet 20. FIG. 6 shows the top surface 2 of the base 2; FIG. 7 shows the planar bottom surface 132 of the base 2. Both FIG. 6 and FIG. 7 show the through hole 110 in the base 2. In FIGS. 6 and 7, two small lateral surfaces 204, 203 of the base 2, are visible; in FIG. 7, the left narrow surface 4 and the right narrow surface 3 of the base 2 are, additionally, visible.

Figure 4:
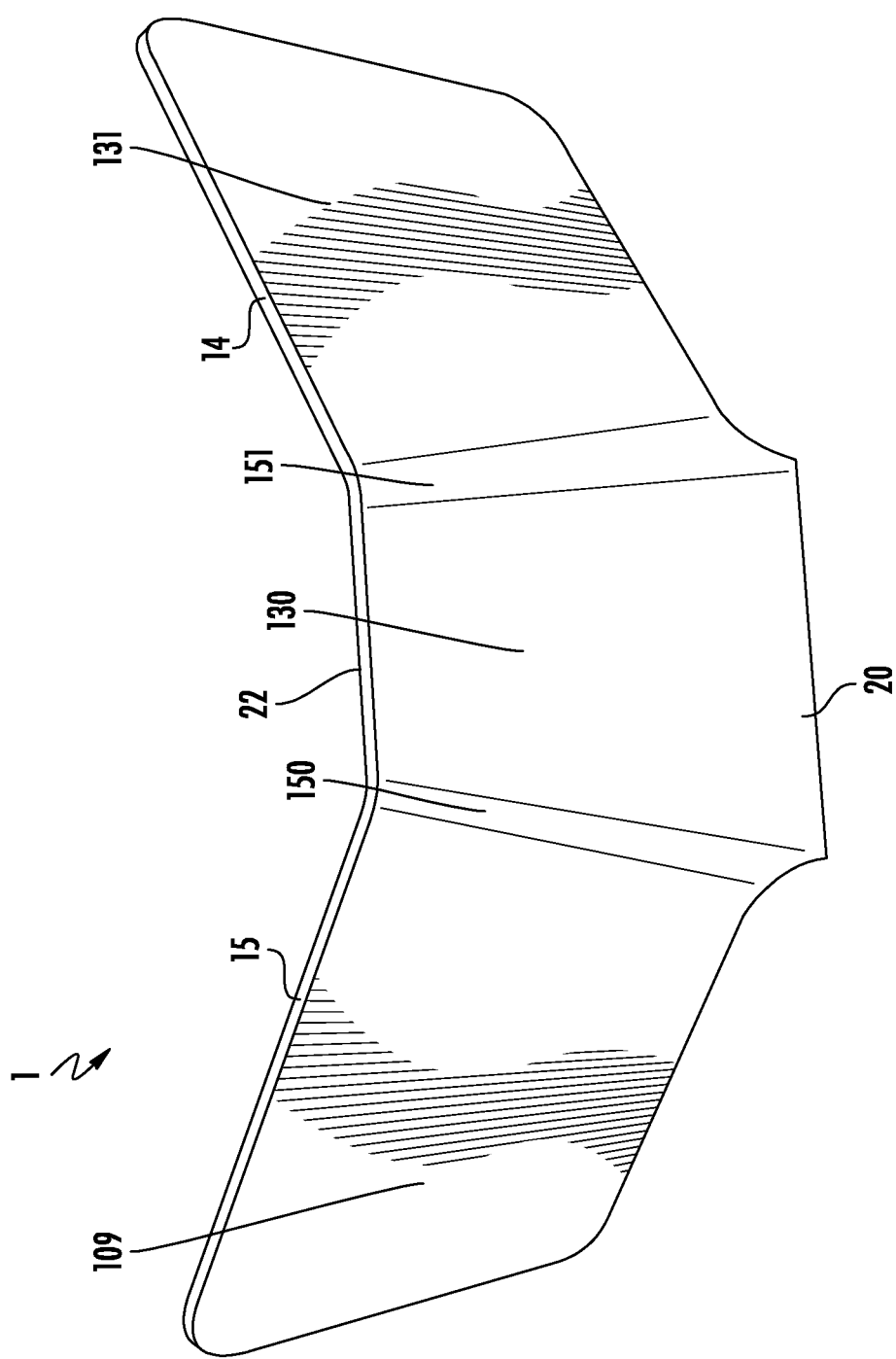
FIG. 4 is a rear view of the present invention.

FIG. 4 shows a rear view of the present invention 1, a device to align a trailer coupler to a hitch ball 1. Surface 109 contiguously connects with surface 130 with a surface fillet 150; surface 131 contiguously connects with surface 130 with a surface fillet 151. A plurality of front edges as discernible 15, 22, 14. The bottom surface fillet 20 is partially visible.

The present invention 1 is a device to align a trailer coupler to a hitch ball 1, protecting the vehicle in the process. FIGS. 8-11 show the present invention attached to a standard ball mount 202, 206, 204, 205, 210. The standard ball mount 202, 206, 204, 205, 210 includes a piece of square tubular steel, the ball mount shank 204. The ball mount shank 204 is sized to fit into a hitch receiver 302. The ball mount shank 204 typically has a through hole 205 to secure a hitch-pin and secure the ball mount shank 204 in the receiver 302. The threaded fastener of the hitch ball shank 210 passes through the through hole 11 of the base 2 of the present invention 1 and the ball mount 202. The hitch ball 200 is secured in place with a standard washer 203 and nut 201 arrangement. A curved member 206, 202, forming the ball mount platform 206, 202 is attached to the ball mount shank 204. The ball mount platform 206, 202 has a vertical portion 206 and a horizontal portion 202. The vertical portion 206 is durably attached to the ball mount shank 204. The horizontal portion 202 acts as the ball mount platform, itself. The hitch ball 200 is attached to a through hole in the horizontal portion of the ball mount platform 202. The hitch ball 200 has a shank 210 from which a threaded fastener extends through the base 2 of the present invention 1 and the ball mount platform 202.

Figure 11:
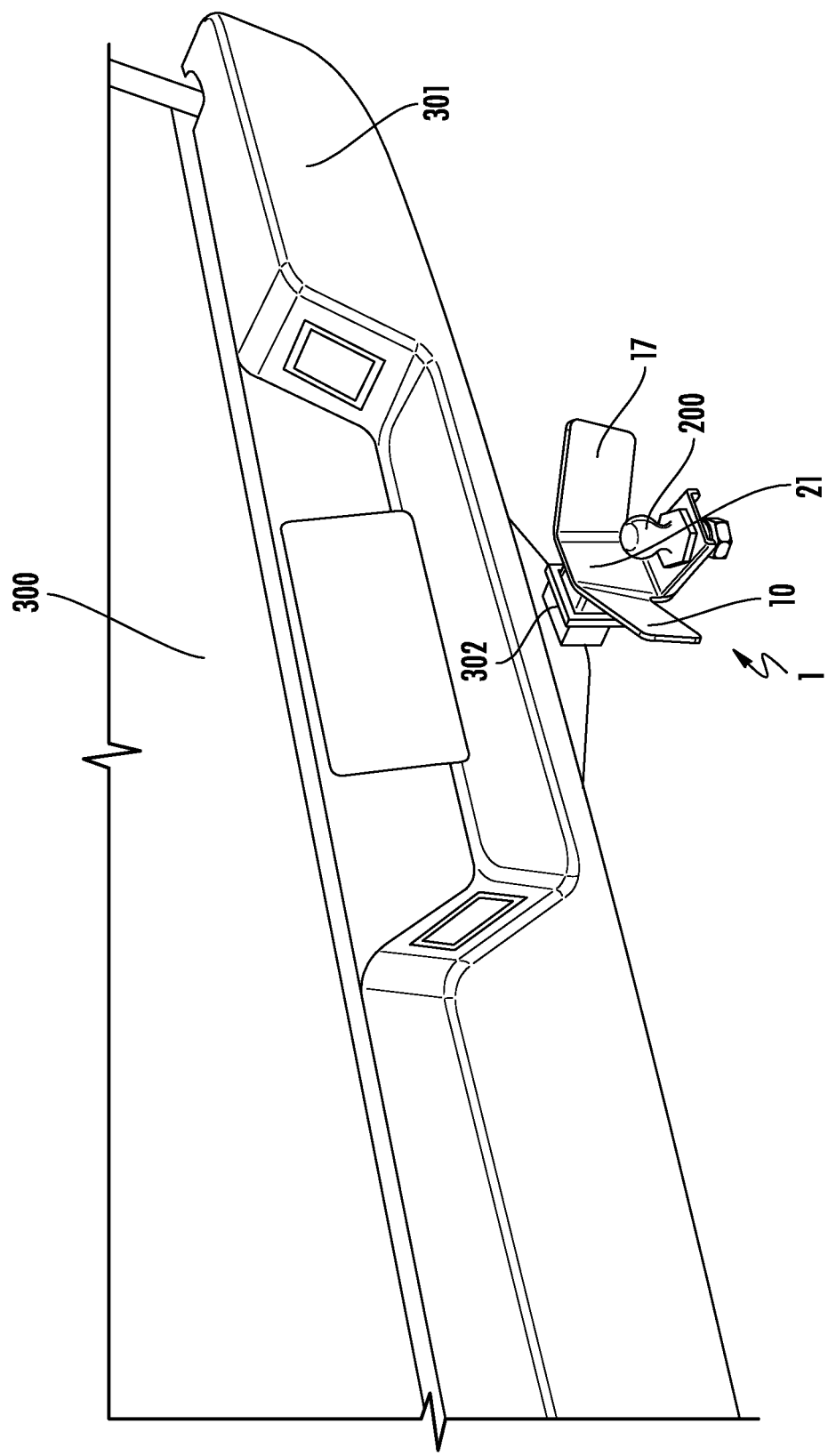
FIG. 11 is an in situ perspective view of the present invention attached to a hitch ball, mounted on the rear of a vehicle.

FIG. 11 shows the present invention 1, in situ. The present invention 1 is attached to a standard ball mount 202, 206, 204, 205. The tubular steel 204 is placed in a receiver 302 and held in place with a hitch pin. The receiver 302 is typically right below the bumper 301 on a vehicle 300. When a user tries to back-up a vehicle 300 to position the hitch ball 200 under the trailer coupler, the present invention 1 acts as a haptic guide.

A user backs up the vehicle 300 until the trailer coupler contacts the present invention 1. If the trailer coupler is offset to the left, the left vertical surface 10 directs the coupler over the hitch ball 200. If the trailer coupler is offset to the right, the right vertical surface 17 directs the coupler over the hitch ball 200. In this way, the present invention 1 allows a user to position the trailer coupler over the hitch ball. Almost as important for most users, the present invention 1 prevents a user from scratching or damaging their vehicle 300 bumper 301 during the hitching operation. With the current price of pick-up trucks and SUVs often exceeding $40,000, the motivation to perform a hitching operation without scratching the vehicle is paramount.

The current invention 1 is fabricated from structural metal, preferably steel. The current invention 1 can also be fabricated from a strong structural material, such as aluminum or magnesium, although these materials would be price prohibitive without really adding much to the performance of the device. The material needs to be corrosion resistant, temperature stable, and environmentally non-reactive. Most steel alloys are appropriate, provided they are treated with a corrosion coating such as trivalent chromium or galvanized zinc. There are numerous suitable corrosion coatings for steel that can be used for the present invention.

The shape is punched from raw steel and then stamped or progressively stamped into its final shape.

For both cosmetic and performance reasons, after stamping, the present invention can be over-molded with a resin. Resins such as polypropylene would allow great cosmetic flexibility to be achieved with the present invention. Additionally, polypropylene, as well as other resins, would have very low co-efficient of friction with the trailer coupler during the coupling operation. This would allow the coupler to more easily move over the vertical surfaces 10, 21, 17 of the present invention 1.

The present invention can be over-molded with other polymers, as well, such acrylonitrile butadiene styrene ("ABS"), polycarbonate, nylon 6, acrylic, polyoxymethylene ("POM"), and glass-reinforced polypropylene

I claim:

1. A device to align a trailer coupler to a hitch ball comprising a base and a plurality of contiguous vertical surfaces, all of which are integrally formed out of a single piece of material;
   wherein the base has a through hole, a planar top surface, a planar bottom surface, and two small lateral surfaces which are orthogonal to the planar bottom surface;
   wherein all of the plurality of vertical surfaces are orthogonal, or nearly orthogonal, to the planar top surface of the base;
   wherein a ball mount hitch can be fastened to the devices by inserting a hitch-ball-shank fastener through the through-hole and a hitch ball platform, and fastening the hitch-ball-shank fastener with a threaded fastener;
   wherein there are three vertical surfaces, a left vertical surface, a center vertical surface, and a right vertical surface;
   wherein the left vertical surface, the central vertical surface, and the right vertical surface are contiguous with one another;
   wherein the left vertical surface is attached to the central vertical surface with a vertical surface fillet;
   wherein the right vertical surface is attached to the central vertical surface with a vertical surface fillet;
   wherein the vertical surface fillet between the left vertical surface and the central vertical surface creates an acute angle between the left vertical surface and the central vertical surface;
   wherein the vertical surface fillet between the right vertical surface and the central vertical surface creates an acute angle between the right vertical surface and the central vertical surface;
   wherein the central vertical surface has a top edge with an associated length, the length of the top edge being the width of the central vertical surface at its top end;
   wherein at a bottom end of the central vertical surface, the central vertical surface has a horizontal surface fillet parallel with, and disposed away from the top edge;
   wherein the horizontal surface fillet has a linear length, the linear length of the horizontal surface fillet being the width of the central vertical surface at its bottom end; and
   wherein the linear length of the top edge is smaller than the linear length of the horizontal surface fillet.

\* \* \* \* \*